C. E. BROWN.
OIL BURNER.
APPLICATION FILED OCT. 14, 1918.
1,294,039.   Patented Feb. 11, 1919.
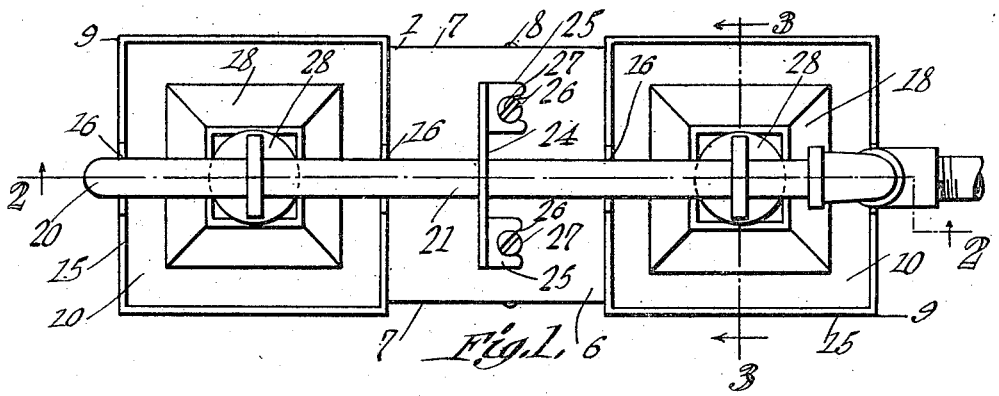
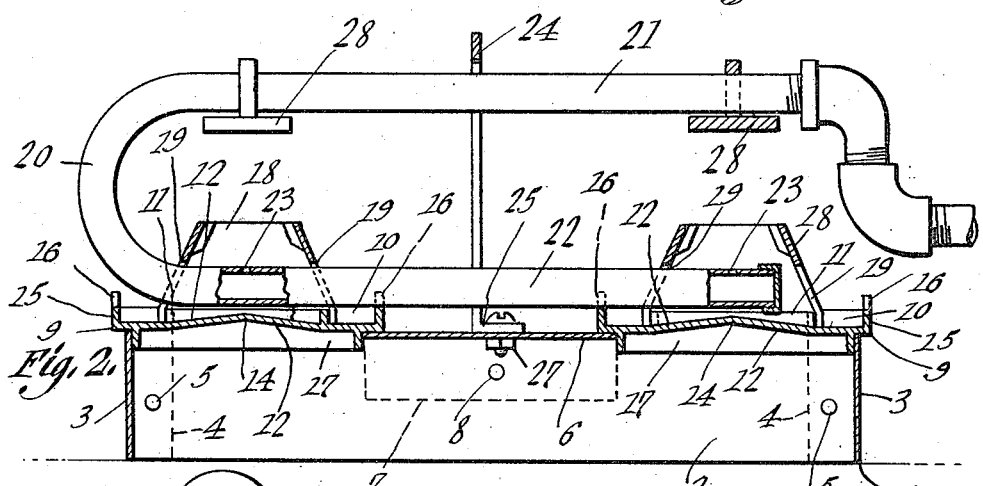
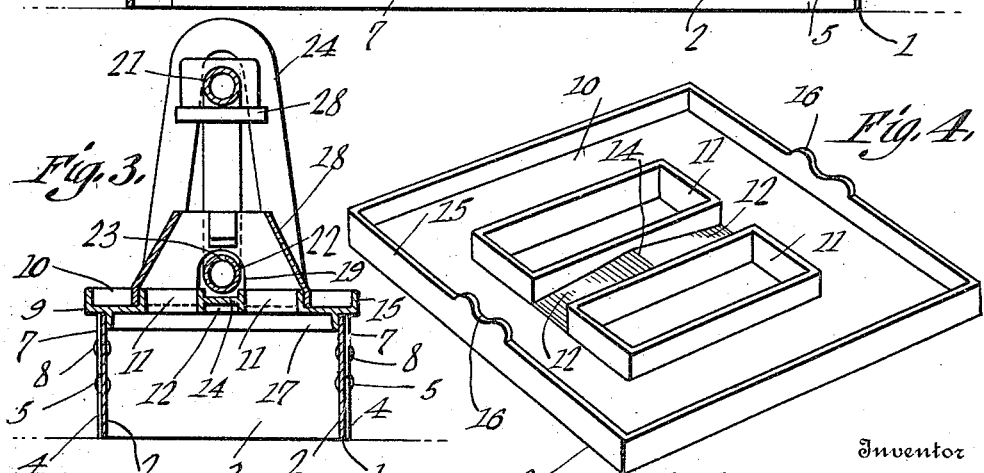
Inventor
C. E. Brown
By C. A. Snow & Co.
Attorneys
Witness

UNITED STATES PATENT OFFICE.

CARL ERNEST BROWN, OF COLUMBUS, OHIO.

OIL-BURNER.

1,294,039.                    Specification of Letters Patent.    Patented Feb. 11, 1919.

Application filed October 14, 1918. Serial No. 257,996.

*To all whom it may concern:*

Be it known that I, CARL E. BROWN, a citizen of the United States, residing at Columbus, in the county of Franklin and State of Ohio, have invented a new and useful Oil-Burner, of which the following is a specification.

The device forming the subject matter of this application is a burner, adapted to be employed in connection with fluid fuel, and one object of the invention is to improve the pan through which the air passes during the burning operation.

Another object of the invention is to provide novel means for supporting the pan and the generator pipe.

It is within the province of the invention to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a top plan; Fig. 2 is a section on the line 2—2 of Fig. 1, parts being left in elevation; Fig. 3 is a cross section on the line 3—3 of Fig. 1; and Fig. 4 is a perspective showing the pan.

In carrying out the invention there is provided a box-like base 1 which may be made of sheet metal. The base 1 includes sides 2 and ends 3, the ends having flanges 4 overlapped on the sides 2 and attached thereto by securing elements 5. A bridge 6 extends transversely on the base 1, intermediate the ends thereof, and is provided with depending flanges 7 attached to the sides 2 of the base 1 by means of securing elements 8.

The invention includes any desired number of pans 9. Each pan 9 includes a bottom comprising a marginal portion 10, spaced flues 11, and oppositely inclined parts 12 disposed between the flues, the said parts 12 discharging on the marginal portion 10 and defining an edge 14. The bottom of the pan 9 is supplied with an upstanding rim 15 having seats 16, the bottom of the pan carrying a depending flange 17. The flange 17 fits within the rectangle defined by one edge of the bridge 6, the sides 2, and one of the ends 3. The bridge, therefore, serves to hold the pans spaced apart. About both flues 11 of each pan 9, a sleeve 18 fits, the sleeve being supported on the bottom of the pan. The sleeves 18 have oppositely disposed openings 19 and are in the form of frusto-tetragonal pyramids.

The numeral 20 marks a U-shaped generator, including an upper arm 21 and a lower arm 22, it being understood, however, that the generator may be constructed as desired. The lower arm 22 of the generator 20 passes through the openings 19 in the sleeves 18 and is supported on the seats 16 which are formed on the rims 19 of the pans 9. The lower arm 22 of the generator 20 is provided with combustion orifices 23, disposed within the sleeves 18 and arranged, preferably, directly above the edges 14 defined by the parts 12 of the pans 9.

The invention includes a U-shaped support 24 which passes over the top of the upper arm 21, and engages the side portions of the upper arm 21, to prevent the generator from tilting laterally, with the lower arm 22 and the seats 16 as a fulcrum. The U-shaped support 24 is supplied with feet 25 having notches 26 receiving bolts 27 or like securing elements, assembled with the bridge 6. It is to be observed that the bridge 6 exercises a double function, in that it serves as a means for keeping the pans 9 separated, and serves, also, as a place of attachment for the support 24. Flame spreaders 28 are mounted on the upper arm 21 of the generator 20, and are located above the sleeves 18.

In practical operation, air is drawn upwardly through the base 1 and through the flues 11 and the sleeves 18, the oil in the arm 21 being heated, and being converted into gas which, burning at the orifices 23, produces a flame which is ejected through the upper ends of the sleeves 18.

When a priming charge is permitted to flow out of the orifice 23, this charge is received by the oppositely inclined parts 12 and is deflected on the marginal part 10 of the bottom of the pan 9, the oil flowing outwardly through the openings 19 in the sleeves 18. It is to be observed that these openings 19, therefore, exercise a double function, in that they permit the egress of the oil and permit, also, the passage of the lower arm 22 of the generator 20 through the sleeves 18.

Having thus described the invention, what is claimed is:—

1. In a device of the class described, a box-like base; a pan on the base and comprising a bottom including a marginal portion, spaced flues, and oppositely inclined parts between the flues, said parts sloping toward the marginal portion; a sleeve surrounding the flues and supported on the base, the sleeve having openings in its lower edge alined with said oppositely inclined parts; and a generator passing through the openings and having a combustion orifice disposed within the sleeve and coöperating with said inclined parts, the openings being unencumbered below that part of the generator which is located in the openings, to form outlets at the lower ends of said inclined parts.

2. In a device of the class described, a box-like base; a bridge on the base; a pan supported on the base and the bridge, the pan having a flue and being provided with an upstanding rim; a sleeve surrounding the flue; a U-shaped generator pipe including upper and lower arms, the lower arm passing through the sleeve and being provided with a combustion orifice located within the sleeve; and a U-shaped support mounted on the bridge, the support passing over the top of the upper arm of the generator and coöperating with the sides of the upper arm to prevent the generator from swinging laterally with the lower arm and the rim as a point of tilting.

3. In a device of the class described, a box-like base; a bridge extended transversely of the base and including depending flanges; means for securing the flanges to the base; pans supported on the base and on the bridge, the pans having depending flanges disposed within the base and on opposite sides of the bridge, the pans being provided with a flue; a sleeve surrounding the flue; and a generator including a part passing through the sleeve, said part of the generator having a combustion orifice located within the sleeve.

In testimony that I claim the foregoing as my own I have hereto affixed my signature in the presence of two witnesses.

CARL ERNEST BROWN.

Witnesses:
L. G. LATHAM,
W. E. KESSELRING.